Patented Sept. 15, 1942

2,296,167

UNITED STATES PATENT OFFICE 2,296,167

ACYL DERIVATIVES OF VITAMIN B6 AND PROCESS OF MAKING THE SAME

Richard Kuhn and Gerhard Wendt, Heidelberg, Germany, assignors to Winthrop Chemical Company, Inc., New York, N. Y., a corporation of New York No Drawing. Application February 21, 1939, Serial No. 257,662. In Germany February 21, 1938

6 Claims. (Cl. 260—297)

The present invention relates to acyl derivatives of vitamin B6 and process of making the same.

It is known that vitamin B6 is one of the active substances of the water-soluble vitamin-B-complex. When food for rats is deficient in vitamin B6, serious skin-diseases similar to the human pellagra occur. By admixing to the food vitamin B6 or vitamin B6 containing preparations the rat pellagra can be cured or prevented. The chemical structure of vitamin B6 is not known. What is known is that it is a substance soluble in water but insoluble in fats.

In accordance with our present invention we have found that the vitamin B6 itself having the formula $$C_8H_{11}O_3N$$

or concentrates of any vitamin B6 content can be acylated and that the acyl derivatives thus obtained possess valuable properties, the vitamin B6 efficacy, however, being not diminished by the acylation. Above all the acyl compounds are soluble in fats and oils and fat solvents as, for instance, chloroform, ether etc., thus making possible the production of solutions containing vitamin B6 and a fat-soluble vitamin as, for instance, vitamin A or D in the same solvent. These solutions are valuable for therapeutic purposes. Further the acyl compounds are valuable as they possess chemical properties different from the free vitamin B6 itself, but more suitable for its purification. Especially advantageous for a purification is the fact that the acyl compounds contrary to the vitamin B6 itself can be sublimed in a high vacuo. Further the acyl compounds are still capable for forming salts with acids, which are less soluble in fats and fat-solvents, but show a good crystallizability. The salts of the acyl compounds are therefore also valuable and the appended claims are intended to cover the acyl compounds as well as their salts. Contrary to the vitamin B6 itself, however, the acyl derivatives show no color reaction with ferric chloride.

The process for obtaining our new acyl derivatives consists in acylating vitamin B6 itself or salts of the vitamin B6 or concentrates of any vitamin B6 content. Obviously it is immaterial from which sources the vitamin B6 or vitamin B6 concentrate has been produced. The acyl radicals contained in our new vitamin B6 derivatives are acyl radicals of lower molecular aliphatic acids and of acids of the benzene series. By acids of the benzene series we mean compounds containing a monophenyl group. As acylating agents there come into consideration anhydrides or halides of organic acids such as acetic anhydride, acetyl chloride, or benzoyl chloride. The acylation may be performed if necessary in the presence of acid-binding agents, as, for instance, tertiary bases and alkali salts of weak acids as, for instance, sodium acetate, potassium acetate etc. By the acylation 3 acyl groups enter the vitamin B6 molecule. Therefore the formula $C_8H_8N(O.acyl)_3$ may be regarded as a general one for the pure vitamin B6 acyl derivatives.

Preferably we make the acetyl derivatives by acylating the vitamin B6, concentrates of vitamin B6 respectively, for instance with acetic anhydride or acetyl chloride. The acyl vitamin B6 compounds obtained are generally speaking colorless oils easily soluble in water. However, by subliming the triacetyl vitamin B6 we have been succeeded in obtaining this substance in a crystallized state. When the calculated amount of 0.1 normal etherial hydrochloric acid is added the triacetyl vitamin B6 hydrochlorides crystallize.

Obviously salts with other acids can be obtained.

The following examples illustrate the invention without, however, restricting it thereto, the parts being by weight:

*Example 1*

10 kg. of dry yeast are extracted with aceton in the heat. The dry residue of the evaporated aceton solution is extracted with water and freed from inactive impurities by precipitating with mercury salts. The filtrate of the mercury precipitate is freed from mercury by means of hydrogen sulfide and evaporated to dryness. The residue is extracted with aceton, the aceton solution stirred with fuller's earth, and the adsorbate extracted with a mixture consisting of water, methanol and piperidine. The extract is evaporated to dryness in vacuo and dried over phosphorus pentoxide. The residue, about 3 g., is dissolved in 10 cc. of glacial acetic acid. A mixture consisting of 50 cc. of acetic anhydride and 100 cc. of pyridine is added. This mixture is allowed to stand over night, then warmed in a water-bath for 30 minutes, evaporated to dryness and dried over solid potassium hydroxide. For further purification the residue is dissolved in 50 cc. of chloroform, 4 times shaken out with 30 cc. of water and the chloroform solution evaporated to dryness. The residue of the chloroform solution is subjected at a pressure of $10^{-5}$ mms. to a sublimation. At 85–90° the acetyl vitamin passes over and is obtained in form of beautiful needles.

Example 2

3 g. of the residue of the bleaching earth's extract obtained according to Example 1 are dissolved in 100 cc. of pyridine, and thereto 50 cc. of acetic acid anhydride are added. After standing for 24 hours the solution is poured into 300 cc. of water, evaporated to dryness, the residue is dissolved in water and extracted with ether in the perforator. The ethereal solution is evaporated to dryness, the residue is dissolved in 20 cc. of chloroform and 5 times shaken out with 10 cc. of normal hydrochloric acid. The united extracts of hydrochloric acid are evaporated to dryness and the residue is hardened by repeated evaporation with acetone. The flark is rinsed out for several times with anhydrous acetone, then with ice-cold acetone, and the crystallized non-dissolved residue is dissolved in some water, acetone is added thereto until rendering turbid and the acetyl chlorohydrate is allowed to crystallize.

Example 3

1 part of vitamin B₆ hydrochloride is heated to boiling with 20 parts of acetic acid anhydride for half an hour, whereby the vitamin is slowly dissolved. The solution is allowed to cool and then 3 parts of a 60 per cent alcohol are added. This mixture is allowed to stand over night, then evaporated to dryness in vacuo, and the triacetyl vitamin B₆ is obtained as a colorless oil being easily soluble in alcohol and chloroform, sparingly in water.

By adding the calculated amount of 0.1 normal ethereal hydrochloric acid to the oil, the triacetyl vitamin B₆ hydrochloride crystallizes in star-shaped arranged prisms which when recrystallized from alcohol-ether show a melting point of 150–151° and contrary to the unesterified vitamin B₆ show no color reaction with ferric chloride. According to the analysis it has the formula $C_{14}H_{18}O_6NCl$.

The same compound is obtained by allowing to stand for one day a mixture of 1 part of vitamin B₆ hydrochloride with 50 parts of anhydrous pyridine and 10 parts of acetic acid anhydride, pouring it into water, shaking out the solution after some hours with chloroform, evaporating the chloroform in vacuo and treating the residue with ethereal hydrochloric acid.

Example 4

1 part of vitamin B₆ hydrochloride is heated to boiling with 20 parts of propionic acid anhydride for half an hour. The vitamin dissolves slowly. When cool 3 parts of a 60% alcohol are added, the reaction mixture is allowed to stand for some time, then the solvent is evaporated under reduced pressure, and thus the tripropionyl-vitamin B₆ is obtained as a colorless oil easily soluble in alcohol, ether and chloroform but difficultly soluble in water. When ethereal hydrochloric acid is added to the oil, the hydrochloride having the formula $C_8H_8N(OCOC_2H_5)_3.HCl$ crystallizes immediately. When recrystallized from alcohol ether the melting point is about 120° C. The substance shows no color reaction with ferric chloride.

We claim:

1. Fat soluble vitamin B₆ preparations essentially consisting of therapeutically pure acetyl derivatives of vitamin B₆ concentrates.

2. Fat-soluble vitamin B₆ preparations essentially consisting of therapeutically pure acetyl derivatives of vitamin B₆ in substantially pure form.

3. A fat-soluble vitamin B₆ preparation essentially consisting of therapeutically pure acetyl derivative of vitamin B₆ having the probable formula

$$C_8H_8N(OCOCH_3)_3$$

representing generally a colorless oil easily soluble in alcohol and chloroform, but sparingly soluble in water, forming, when added the calculated amount of ethereal hydrochloric acid, the triacetyl vitamin B₆ hydrochloride in star-shaped arranged prisms which when recrystallized from alcohol-ether show a melting point of 150–151° and contrary to the free vitamin B₆ itself show no color reaction with ferric chloride.

4. Fat-soluble vitamin B₆ preparations essentially consisting of therapeutically pure acyl derivatives of vitamin B₆ in substantially pure form, the acid radicles contained in said preparations being the acyl radicles of the lower molecular saturated aliphatic acids.

5. Fat-soluble vitamin B₆ preparations essentially consisting of therapeutically pure acyl derivatives of vitamin B₆ having the formula

$$C_8H_8N(O.acyl)_3$$

the acyl radicles contained in said preparations being acyl radicles of the lower molecular saturated aliphatic acids representing colorless oils soluble in fats and fat-soluble solvents, but sparingly soluble in water, forming salts with acids and showing contrary to the free vitamin B₆ itself no color reaction with ferric chloride.

6. Fat-soluble vitamin B₆ preparations essentially consisting of therapeutically pure acyl derivatives of vitamin B concentrates, the acyl radicles contained in said preparations being the acyl radicles of the lower molecular saturated aliphatic acids.

RICHARD KUHN.
GERHARD WENDT.

DISCLAIMER 2,296,167.—*Richard Kuhn* and *Gerhard Wendt*, Heidelberg, Germany. ACYL DERIVATIVES OF VITAMIN $B_6$ AND PROCESS OF MAKING THE SAME. Patent dated Sept. 15, 1942. Disclaimer filed Oct. 26, 1946, by the assignee, *Winthrop Chemical Company, Inc.*

Hereby enters this disclaimer to claims 1, 2, 4, and 6 in said specification.

[*Official Gazette December 10, 1946.*]